United States Patent
Cisneros

(10) Patent No.: US 7,427,383 B2
(45) Date of Patent: Sep. 23, 2008

(54) HYDROGEN SULFIDE REMOVAL METHOD AND SYSTEM FOR TREATING GASEOUS PROCESS STREAMS

(75) Inventor: Ignacio Cisneros, Odessa, TX (US)

(73) Assignee: Nestco LLC, Odessa, TX (US)

( * ) Notice: Subject to any disclaimer, the term of this patent is extended or adjusted under 35 U.S.C. 154(b) by 284 days.

(21) Appl. No.: 11/448,144

(22) Filed: Jun. 5, 2006

(65) Prior Publication Data

US 2007/0280868 A1 Dec. 6, 2007

(51) Int. Cl.
*B01D 53/52* (2006.01)
*B01J 10/00* (2006.01)

(52) U.S. Cl. .................... 423/220; 423/215.5; 423/225; 423/573.1; 423/576; 422/168

(58) Field of Classification Search ............... 423/215.5, 423/220, 225, 573.1, 576; 422/168
See application file for complete search history.

(56) References Cited

U.S. PATENT DOCUMENTS

| | | | |
|---|---|---|---|
| 3,790,659 A * | 2/1974 | Storp et al. | 423/576 |
| 4,622,212 A | 11/1986 | McManus et al. | |
| 5,178,843 A * | 1/1993 | Delzer et al. | 423/220 |
| 6,235,259 B1 | 5/2001 | Ledoux et al. | |
| 6,467,949 B1 | 10/2002 | Reeder et al. | |
| 6,808,621 B1 | 10/2004 | Cisneros | |
| 6,962,683 B2 | 11/2005 | Gangwal et al. | |

* cited by examiner

*Primary Examiner*—Timothy C Vanoy
(74) *Attorney, Agent, or Firm*—Thorpe North & Western LLP

(57) ABSTRACT

A method and system for removing hydrogen sulfide from gaseous process streams, such as sour gas streams are disclosed and described. A gaseous stream containing hydrogen sulfide can be contacted with an aqueous silicon-containing composition under high shear conditions to form a sweetened gaseous product. The gaseous product has significantly reduced hydrogen sulfide content and recovered liquid and solid filtrates are generally non-toxic.

26 Claims, 1 Drawing Sheet

HYDROGEN SULFIDE REMOVAL METHOD AND SYSTEM FOR TREATING GASEOUS PROCESS STREAMS

FIELD OF THE INVENTION

The present invention relates to devices and methods for use in connection with the treatment of sour gas. More particularly, the present invention relates to methods and materials for removing hydrogen sulfide from gaseous streams using silicon-containing compositions. Accordingly, the present invention involves the fields of chemistry, materials science, and chemical engineering.

BACKGROUND OF THE INVENTION

Removing hydrogen sulfide from gaseous process streams can be an expensive, involved, and voluminous venture often involving contact with or use of potentially dangerous chemicals, and producing dangerous and/or toxic materials. Natural gas represents approximately 47% of the products used for fuels, and represents approximately 72% of the products used in the petrochemical industry. Therefore, natural gas is an important resource for the overall energy and petrochemical industries world-wide.

Natural gas is a mixture of hydrocarbons and paraffins, with methane as its principal ingredient, and may include small percentages of ethane, propane, nitrogen, carbon dioxide, sulfuric acid and other materials. Sour gas, or acid gas, is generally defined as natural gas that contains hydrogen sulfide at concentrations up to 20%. Due to the presence of the large quantity of hydrogen sulfide, sour gas is considered toxic. Therefore, before it can be used as natural gas, the sour gas must be treated to remove the hydrogen sulfide resulting in a sweetened natural gas.

The principal objective in treating sour gas is to eliminate hydrogen sulfide ($H_2S$). The most widely used process at this time is the amine process. The most widely used amines are monoethanolamine (MEA) and diethanolamine (DEA) which are most commonly made by reacting ethylene oxide and ammonia. Both amines are irritants to the skin and have a TLV (threshold limit value) of about 3 ppm. Ethylene oxide is an irritant to the eyes and skin, has a TLV of 1 ppm in air and is a suspected human carcinogen; it is also highly flammable, a fire danger and has a high explosive risk. Further, anhydrous ammonia may be fatal in concentrated form, has a TLV of 25 ppm in air, poses a moderate fire risk, and has explosive limits in air of 16 to 25%.

Due to environmental laws, economics and performance, the petrochemical gas and refining industries has seen some dramatic changes in recent years. Present technologies do not address the contaminants found in the final product destined to the consumer and the present regulations with regards to hazardous emissions. Refining and sour gas processing has had very little change in the last 25 years. Refineries, power plants, sour gas treating plants and others are being shut down due to the inability of the processing units to comply with new environmental laws.

As such, there is a need for a method and system to remove hydrogen sulfide from gaseous process streams. Ideally, the method and system would involve less hazardous materials than prevailing methods. Additionally, it is desired that a new method and system be more cost-effective, reduce the size of equipment and area dedicated to processing, improve processing capacity, and produce materials that are non-toxic and non-corrosive.

SUMMARY OF THE INVENTION

Accordingly, the present invention provides a method for removing hydrogen sulfide from a gaseous stream which addresses many of these concerns. The method of the present invention involves contacting the sour gaseous stream with an aqueous, silicon-containing composition under high shear conditions to form a sweetened gaseous product, and removing the gaseous product from a silicon-containing solution.

One aspect of the present invention provides for a hydrogen sulfide removal system for treating gaseous process streams. The system can include a processing unit, which is capable of creating hydraulic shear forces within liquids added to the unit. A gaseous process stream having an undesirable amount of hydrogen sulfide can be fluidly connected to the processing unit. Further, an aqueous silicon-containing composition can also be connected to the processing unit such that the silicon-containing composition and gaseous process stream are in close fluid contact. A separation unit can also be attached to the outlet to separate the outlet stream into a sweetened gaseous outlet stream and a liquid outlet stream.

DETAILED DESCRIPTION

Figure 1:
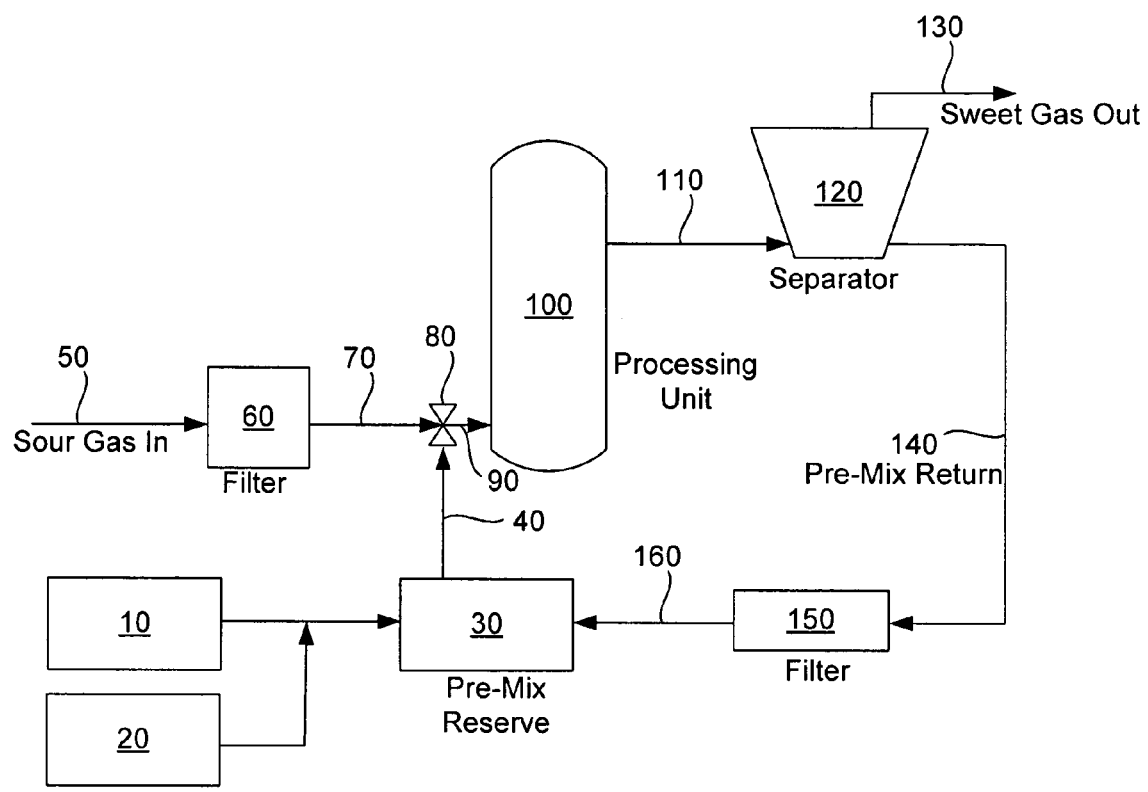
FIG. 1 is a flow diagram depicting an embodiment of the present invention, wherein the sour gaseous stream is first filtered to remove particulates and other contaminants and then combined with a silicon-containing aqueous solution. The gas-solution mixture then enters a processing unit wherein the mixture is subjected to high shear conditions resulting in high surface area contact between the gas and the solution. An exit stream from the processing unit undergoes a separation step which produces a sweetened gaseous product stream and a silicon solution stream that is first filtered to remove particulates and then recycled into the system through combining with a pre-mix aqueous solution.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a layer" includes one or more of such layers, reference to "a shell" includes reference to one or more of such structures.

DEFINITIONS

In describing and claiming the present invention, the following terminology will be used in accordance with the definitions set forth below.

As used herein, "sour gas" refers to any gaseous fluid containing hydrogen sulfide. Most often sour gas can have greater than about 100 ppm hydrogen sulfide although any undesirable amount can also be considered a sour gas.

As used herein, "sweet gas" refers to any gaseous fluid having low hydrogen sulfide, and preferably substantially no hydrogen sulfide. Most often a sweet gas can contain less than about 50 ppm, and preferably less than about 20 ppm hydrogen sulfide.

As used herein, the term "silicon" refers to elemental silicon unless otherwise specifically identified as a "silicon-containing" composition or the like. Silicon useful for the present invention can be any silicon which is has a silicon content sufficient to form useful silicon-containing compositions.

As used herein, the term "cross-stream mixing" refers to increasing the contact area of two different streams. This is particularly challenging and desired herein where the streams are of two different phases such as liquid and gas. Cross-stream mixing increases the mass transfer and reaction area between the two streams and is therefore desirable.

As used herein, "dimensionless residence time" refers to the measurement of the residence time divided by the length of the processing unit and multiplied by the initial stream velocity.

As used herein, "static" with reference to a high shear mixer refers to mixers wherein substantially all of the inner parts of the mixers are non-moving. Static mixers are generally designed to separate the flow into streams and then force the streams against each other. Streams may be separated and forced against each other repeatedly within a static mixer.

As used herein, "portable" refers to systems and devices that are relatively easy to assemble and disassemble. The portability may come from one or multiple sources. The overall size and weight of the system is one source. If the overall size and weight of the system can be fit into one standard commercial truck and can be moved without the assistance of heavy machinery, it is to be considered portable. Likewise, and regardless of the size or weight, if the system can be installed in a 48 hour period by a team of 4-6 individuals, it is to be considered portable.

As used herein, with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

INVENTION

In accordance with the present invention, hydrogen sulfide can be removed from a gaseous stream. In the case of a natural gas stream, this removal of hydrogen sulfide is referred to as sweetening the sour gas. The method of the present invention involves contacting the gaseous stream which contains hydrogen sulfide with an aqueous, silicon-containing composition under high shear conditions. Contacting the sour gas stream in this manner yields a sweetened gaseous, i.e., a product having a reduced content of hydrogen sulfide. The gaseous product can then be removed and used as desired.

FIG. 1 illustrates one embodiment of the present invention. A reserve of concentrated silicon-containing composition 10 can be combined with water 20 to form a pre-mixed aqueous silicon-containing composition held in reserve 30. The concentrated silicon-containing composition can be formed by mixing silicon and a strong base. Non-limiting examples of suitable strong bases can include sodium hydroxide, calcium hydroxide, potassium hydroxide, barium hydroxide, cesium hydroxide, strontium hydroxide, lithium hydroxide, rubidium hydroxide, sodium hydride, lithium diisopropylamide, sodium amide, and combinations thereof. In a currently preferred embodiment, the strong base is sodium hydroxide. Generally, this combination yields sodium silicates, which are water soluble, and hydrogen gas in an exothermic reaction. Generally, the silicon-containing composition includes from about 1 wt % to about 20 wt % silicon, and preferably about 3 wt % to about 8 wt % silicon. However, the necessary silicon content is primarily determined by the level of hydrogen sulfide in the gaseous stream. Higher levels of hydrogen sulfide generally require higher silicon concentrations to remove the hydrogen sulfide. A general guideline for forming the aqueous silicon-containing composition by weight is 5-7 parts silicon, 9-11 parts water, 0.5-2 strong base. One exemplary composition includes 6 parts silicon, 10 parts water, and 1 part strong base.

The silicon used in the present invention can be any suitable source of elemental silicon. Typically, silicon which is greater than about 95% pure silicon, and preferably greater than about 99% pure silicon can be useful. However, elemental silicon sources which are below these ranges can also be useful. Generally, the composition in the reserve 30 can be initially composed of about 1% to about 5% concentrate, with the remainder being water.

A gaseous stream 50 containing hydrogen sulfide can be optionally filtered through a filtering unit 60 to produce a filtered gaseous inlet stream 70. As many gaseous streams, such as sour gas and natural gas type streams contain particulates that may damage the equipment, e.g. via wear and corrosion, and/or reduce or interfere with the removal of hydrogen sulfide from the gaseous stream, filtering of the incoming gaseous stream is often desirable. In one embodiment, the gaseous stream can be filtered prior to contact with the aqueous stream. The gaseous stream can be filtered to remove substantially all particulates greater than about 1 µm. Filters that can be used include, but are not limited to, bag filters, various types of membrane filters, and the like.

The filtered gaseous inlet stream and an aqueous silicon-containing composition stream 40 from the reserve 30 can be mixed at a premix unit 80 to form a combined inlet stream 90. The premix unit can be a separate unit such as a valve or other vessel or may be a part of the processing unit 100. For example, each of the gaseous stream and the silicon-containing composition stream can be directly injected into the processing unit through a common entry, e.g. an open y-junction or other suitable manner. Regardless, the inlet stream mixer can combine the gaseous process stream with the aqueous silicon-containing solution to form a combined gas-liquid inlet stream which can be directed into the processing unit.

The gaseous stream can be almost any gas stream containing undesirable amounts of hydrogen sulfide. The process and methods of the present invention can be useful in treatment of gas streams containing from about 50 ppm to about 500,000 ppm hydrogen sulfide, and typically those containing from about 100 ppm to about 100,000. However, the present invention can also be successfully used with gaseous streams having hydrogen sulfide contents outside these ranges.

The processing unit 100 can be any gas-liquid mixer which is capable of creating hydraulic shear forces sufficient to increase contact surface areas between the incoming gaseous stream and aqueous silicon-containing composition. Preferably, the processing unit is a simple, low maintenance, low energy device. Ideally, the processing unit intimately mixes the gaseous and liquid streams and quickly blends the silicon-containing composition with the gaseous inlet stream. The processing unit can be configured to break down the silicon-containing composition and the gaseous inlet stream into smaller, e.g. micron-sized, droplets and bubbles. Ideally, the droplets and bubbles are less than about 5 micron size, thus allowing the silicon-containing composition to come into contact with a substantial majority of the gaseous stream molecules. During contact, the hydrogen sulfide is reacted to form sulfur compounds which are substantially free of elemental sulfur. A gas-liquid mixture can then be removed directly from the processing unit 100 via an outlet stream 110.

In yet another embodiment, the high shear conditions can be formed by a processing unit which is a high shear mixer. The high shear mixer can have a variety of features including insulation and jacketing, and pressurization capability. Non-limiting examples of suitable high shear mixers can include high-speed dispersers, counter-rotating mixers, homogenizers, high shear rotor-stator mixers, static mixers, mixers with moving mixer baffles, vacuum mixers, and any other design that can obtain high shear conditions. In one currently preferred embodiment, the high shear mixer can be a static mixer. Particularly preferred static mixers can encourage and produces cross-stream mixing such as the in-line static mixers available from a variety of commercial vendors such as Kenics Products (e.g. KMX, KM or WVM) from Chemineer, Inc., Koflo Corp., Komax Systems Inc. and the like. In yet another embodiment, the processing unit is a static high shear mixer which is portable such that the installation and entire system can be readily movable with minimal, if any, disassembly.

Desirable residence time for the gaseous stream can depend on hydrogen sulfide concentration, silicon compound concentrations, processing unit design, and a variety of other factors such as temperature, etc. As a general guideline, residence times from about 1 second to about 10 seconds can be useful and for many designs, the average residence time can be less than about 5 seconds for either the gaseous stream or the silicon-containing composition stream. Actual residence time can also be a function of the processing unit size and the above residence times are based on static mixers about 2 feet in length and 2 inches in diameter. Therefore, dimensionless residence times of less than about 10 can be desirable.

The outlet stream 110 then enters a gas-liquid separator 120, which separates a gaseous product stream 130 (in the case of natural gas, a sweet gas stream) and a silicon-containing aqueous solution stream 140. The gaseous product stream includes a sweetened gas. In one aspect of the present invention, the gaseous product can further include sulfur oxides. In another preferred embodiment, both of the gaseous product and the used silicon-containing aqueous solution are substantially free of elemental sulfur.

The aqueous stream can be optionally filtered at 150 and the filtered silicon-containing solution stream 160 can be recycled back into the system through addition to the premixed aqueous silicon-containing composition reserve 30. Such filtering can be designed to remove sediment and is facilitated by using membrane filters, carbon filters, wound fibrous filters, or other filters which allow for sufficient flow rates as would be apparent to one of ordinary skill in the art. The filtering is designed to remove substantially all particulates greater than about 1 µm.

The gaseous stream and the aqueous stream contact and form a gaseous product and a silicon-containing solution. As has been noted, the gaseous product is removed from the silicon-containing solution, and then the silicon-containing solution is the portion recycled, or used again in the method, and thereby used to contact another separate gaseous stream or additional portions of the original gaseous stream. In a further embodiment, the silicon-containing composition can be filtered prior to re-use. In this instance, filtering is done optimally after the gaseous product is removed from the silicon-containing solution. Filters which can be suitable for use in the present invention can include, but are not limited to, membrane filters, particulate filters or the like. Currently, membrane filters are preferred and serve the purpose of removing sediment, which comprises inert particles in the water and the gas, from the silicon-containing solution. Typically, the sediment is inert and non-hazardous. Alternatively, the filtering may occur prior to the removal of the gaseous product.

In a recycled system, the silicon-containing solution can be analyzed, preferably in-stream if a continuous process, and additional silicon-containing composition of the necessary concentration can be added prior to contacting the gaseous stream. The concentration of the silicon-containing composition can most often be in excess for the reaction with hydrogen sulfide such that it is not rate-limiting. However, the exact concentration can be varied to achieve a desired degree of hydrogen sulfide reduction from the gaseous stream. As the silicon-containing composition can change during processing, e.g. loss of catalyst or formation of undesirable silicon compounds, adding a make-up stream of an appropriately concentrated silicon-containing composition can replenish and help maintain the effectiveness of the reaction. Alternatively, the filtering step can be prior to the gas-liquid separation step.

To facilitate a more efficient system, sensors can be placed at various points of the system to better manage system parameters. For example, a sensor to determine the amount of hydrogen sulfide in the gaseous inlet stream 70 can be used to determine a corresponding amount of silicon concentration for the silicon-containing composition. Furthermore, a sensor to determine the amount of hydrogen sulfide in the gaseous product stream 130 can be used to determine the composition of the final product, and the efficiency. The parameters of the system (flow rates, processing unit-specific parameters such as rpm of moving baffles, residence time, temperature, pressure, etc.) can be adjusted to obtain an optimal and/or desired removal of hydrogen sulfide as judged by the analysis of the gaseous product stream. Furthermore, analysis of the filtered silicon-containing solution stream 160, can be used to determine the amount of both water and silicon-containing composition concentrate to add to the pre-mixed aqueous silicon-containing composition reserve. Also, the amount of water and silicon-containing composition concentrate can vary to account for changes in gaseous inlet stream compositions.

Another embodiment of the present invention requires the yield of the gaseous product to be less than about 10 ppm of hydrogen sulfide, and preferably less than about 6 ppm. In yet another embodiment, the gaseous and liquid products are substantially free of elemental sulfur. In a further embodiment, the gaseous product includes sulfur oxides formed from the hydrogen sulfide. Depending on the hydrogen sulfide content in the initial gaseous stream, one embodiment of the present invention involves reducing the hydrogen sulfide concentration by greater than about 90%. Most preferably, the hydrogen sulfide concentration is reduced by greater than about 95%. However, it is to be noted that when the initial concentration of hydrogen sulfide is relatively low. For example, a gas stream containing 16 ppm hydrogen sulfide may be reduced to 8 ppm which in some cases can be a useful reduction, but which would be a 50% reduction. Similarly, a sour gas stream containing 100 ppm or greater can readily be treated in accordance with the present invention to achieve 10 ppm or less. That said, the present invention is still a preferred method for reducing already-low concentrations of hydrogen sulfide in gaseous streams, as other benefits are realized from the use of the present method, such as non-toxic products, reduced cost, reduced size, reduced time, and overall ease in operation.

A preferred embodiment of the present invention involves performing the method continuously, or as a continuous process. However, the method may be performed batchwise or semi-continuously. Selection of the type of process used should be determined by the conditions, equipment used, type and amount of gaseous stream, and other factors apparent to one of ordinary skill in the art based on the disclosure herein.

In one aspect of the present invention, the contacting step at the processing unit can be performed at a temperature of less than about 110° C. The step of contacting can most often be performed at room temperature such that additional heat is not required beyond what is supplied by the contacting step conditions, e.g. high shear mixer and exothermic reactions. Additionally, in an embodiment, the contacting step may be performed at a pressure of less than about 100 psig. The absence of pressurized equipment and heating elements can significantly reduce the cost and complexity of running and maintaining the equipment used in the present invention.

In one preferred embodiment, the gaseous stream and the aqueous silicon-containing composition can be contacted at a volume ratio from about 1:1.5 to about 1:4. Preferably, the gaseous stream and the aqueous silicon-containing composition are contacted at a volume ratio of about 1:2. As a general guideline, the silicon-containing composition can be provided in stoichiometric excess such that the concentration of silicon catalyst is not rate limiting.

Use of the present invention can include an optional pH meter to maintain the proper level of pH, and therefore silicon content and concentration. This will accommodate constant changes to the gaseous inlet stream, and is therefore much more able to actively react to changes in conditions of the stream to be treated. With this feature, there is no need to shut down an entire system to adjust parameters for fluctuating inlet stream conditions, as with an amine processing plant. Furthermore, the present invention can work at ambient temperatures and low pressures, to high pressures and temperatures.

The invention set forth herein has great application in the petrochemical and energy industries. Additionally, the present invention can be used for the treatment of gas and liquids in an oil refinery, the treatment of sour gas, the treatment of coal seam gas, the treatment of hazardous stack emissions, the treatment of land field gasses, and a new series of devices dealing with hazardous emissions for human safety.

EXAMPLE

The following example illustrates various methods and systems of removing hydrogen sulfide from a gaseous stream in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

An aqueous silicon-containing composition was created by first obtaining silicon crystal rock (99.8% pure elemental Si). The rock was crushed to size about 1 to 1-½ inches or smaller. The crushed silicon was placed into a reactor vessel with water and caustic soda (about 50% NaOH). The mixture was mixed at ambient conditions and produced heat as the result of an exothermic reaction. Approximately 110 gallons of silicon-containing composition was formed by combining 86.5 pounds of silicon, 59.7 gallons of water, and 22.35 gallons of caustic soda as described.

The above silicon-containing composition was used to contact a sour gas stream having about 100,000 ppm $H_2S$, at ambient temperature. The sour gas was filtered using a membrane filter and the filtered sour gas and the above silicon-containing composition were injected into a processing unit. The processing unit was a high shear static mixer measuring about 24" long and 2" inner diameter. The ratio of sour gas to silicon-containing solution was about 2 to 1 by volume. The sour gas and solution were maintained at a flow rate to achieve about a 10 second residence time. The separation unit was a conventional stainless steel gas-liquid separator. The silicon-containing solution from the separator was recycled into the reactor vessel. The gaseous product stream from the separator was tested according to standard gas detectors used in the gas industry. The gaseous product stream contained less than 10 ppm $H_2S$. The same process was also used to treat sour gas having 200, 2000, 5,000, 10,000 and up to 100,000 ppm $H_2S$ with similar results.

A sample of the material filtered from a product stream was tested according to Department of Transportation test No. 49 CFR part 173, Appendix A, using protocol S9-DC0173.136. The results indicated that the filtered material was not corrosive. The sample of filtered material was also tested according to EPA method 1002.,0 (seven day chronic ceriodaphnia dubia survival and reproduction test) and EPA method 1000.,0 (seven day chronic pimephales promelas larval survival and growth test). The results indicated that the filtered material is also non-toxic.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for removing hydrogen sulfide ($H_2S$) from a gaseous stream comprising:
    a) contacting the gaseous stream containing hydrogen sulfide with an aqueous silicon-containing composition under high shear conditions to form a sweetened gaseous product; and
    b) removing sweetened the gaseous product from the silicon-containing solution.

2. The method of claim 1, further comprising the step of recycling the silicon-containing composition subsequent to the step of removing the gaseous product.

3. The method of claim 2, further comprising the step of filtering the silicon-containing solution prior to the step of recycling the gaseous stream, and subsequent to the step of removing the sweetened gaseous product.

4. The method of claim 1, wherein the silicon-containing composition is formed by mixing silicon and a strong base.

5. The method of claim 4, wherein the strong base is sodium hydroxide.

6. The method of claim 4, wherein the aqueous silicon-containing composition includes solubilized silicates.

7. The method of claim 1, wherein the high shear conditions are formed by a high shear mixer.

8. The method of claim 7, wherein the high shear mixer is a static mixer.

9. The method of claim 1, wherein the gaseous stream has a residence time of about 5 to about 10 seconds.

10. The method of claim 1, wherein a yield of the sweetened gaseous product has less than about 10 ppm $H_2S$.

11. The method of claim 1, wherein the sweetened gaseous product is substantially free of elemental sulfur.

12. The method of claim 1, which is performed continuously.

13. The method of claim 1, wherein the step of contacting is performed at a temperature of less than about 110° C. and a pressure of less than about 100 psig.

14. The method of claim 1, wherein the gaseous stream and the aqueous silicon-containing composition are contacted at a volume ratio from about 1:1.5 to about 1:4.

15. The method of claim 1, wherein the gaseous stream is filtered to remove substantially all particulates greater than about 1 μm before contacting the aqueous stream.

16. The method of claim 1, wherein the step of removing the gaseous product includes directing the gaseous product and the silicon-containing solution to a gas-liquid separator.

17. A hydrogen sulfide removal system for treating gaseous process streams comprising:
    a) a processing unit having an inlet and an outlet, said processing unit capable of creating hydraulic shear forces upon addition of a liquid at the inlet;
    b) a gaseous process stream containing hydrogen sulfide fluidly connected to the inlet;
    c) a liquid source of an aqueous silicon-containing composition fluidly connected to the inlet; and
    d) a separation unit attached to the outlet, such that an outlet stream is separated into a gaseous outlet stream and a liquid outlet stream.

18. The hydrogen sulfide removal system of claim 17, further comprising an inlet stream mixer connected to the inlet such that the gaseous process stream is mixed with the aqueous silicon-containing solution to form a combined gas-liquid inlet stream.

19. The hydrogen sulfide removal system of claim 17, wherein the liquid outlet stream is fluidly connected to the liquid source for recycling.

20. The hydrogen sulfide removal system of claim 19, wherein the liquid outlet stream is filtered prior to entering the liquid source to remove unwanted sediments.

21. The hydrogen sulfide removal system of claim 17, wherein the gaseous process stream is filtered to remove substantially all particulates greater than about 1 μm prior to entering the processing unit.

22. The hydrogen sulfide removal system of claim 17, wherein the aqueous silicon-containing composition is formed by mixing silicon and a strong base.

23. The hydrogen sulfide removal system of claim 22, wherein the strong base is sodium hydroxide.

24. The hydrogen sulfide removal system of claim 17, wherein the aqueous silicon-containing composition includes solubilized silicates.

25. The hydrogen sulfide removal system of claim 17, wherein the processing unit is a static high shear mixer.

26. The hydrogen sulfide removal system of claim 25, wherein the high shear mixer is portable.

* * * * *